United States Patent
Krishnakumar et al.

(10) Patent No.: US 10,802,604 B1
(45) Date of Patent: Oct. 13, 2020

(54) MECHANICAL SWITCH FOR AN INFORMATION HANDLING SYSTEM

(71) Applicant: Dell Products L.P., Round Rock, TX (US)

(72) Inventors: Karthikeyan Krishnakumar, Austin, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/697,397

(22) Filed: Nov. 27, 2019

(51) Int. Cl.
*G09G 5/00* (2006.01)
*G06F 3/02* (2006.01)
*G06F 1/26* (2006.01)
*G06F 3/023* (2006.01)

(52) U.S. Cl.
CPC .............. *G06F 3/0202* (2013.01); *G06F 1/26* (2013.01); *G06F 3/023* (2013.01)

(58) Field of Classification Search
CPC ............ G06F 1/169; G06F 3/033; G06F 3/02; G09G 5/00; G09G 5/08
See application file for complete search history.

(56) References Cited

U.S. PATENT DOCUMENTS

| | | | |
|---|---|---|---|
| 2012/0229708 A1* | 9/2012 | Choi | H03J 1/0025 348/734 |
| 2013/0058048 A1* | 3/2013 | Choi | G06F 1/1681 361/727 |
| 2018/0107284 A1* | 4/2018 | Hou | H01H 13/702 |
| 2019/0258290 A1* | 8/2019 | Song | G06F 1/169 |

* cited by examiner

*Primary Examiner* — Pegeman Karimi
(74) *Attorney, Agent, or Firm* — Baker Botts L.L.P.

(57) ABSTRACT

Systems and methods are disclosed for a mechanical switch that may include receiving an input from a user of a smart keyboard causing the mechanical switch to be in a closed position causing a microcontroller unit to be in an on state and the smart keyboard to be electrically enabled for use; monitoring the smart keyboard for additional input from the user; determining if a first threshold period has occurred in which the additional input from the user has ended; causing the microcontroller unit to be in an idle state; determining if a second threshold period has occurred in which the first threshold period has ended; causing the mechanical switch of the smart keyboard to be in an open position causing the microcontroller unit to be in an off state and the smart keyboard to be electrically disabled for use.

20 Claims, 5 Drawing Sheets

MECHANICAL SWITCH FOR AN INFORMATION HANDLING SYSTEM

BACKGROUND

Field of the Disclosure

The disclosure relates generally to information handling systems, and in particular to a mechanical switch for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed smart keyboard for an information handling system includes: at least one battery; a microcontroller unit having an on state and an off state; a mechanical switch electrically coupling the at least one battery to the microcontroller unit, the mechanical switch having an open position causing the microcontroller unit to be in the off state and a closed position causing the microcontroller unit to be in the on state, the mechanical switch including: a printed circuit board (PCB) having a first PCB end and a second PCB end; a switch slide plate slidably coupled to the PCB, the switch slide plate configured to slide toward the first PCB end of the PCB causing the mechanical switch to be in the closed position and to slide toward the second PCB end of the PCB causing the mechanical switch to be in the open position; a switch slide spring configured to pull the switch slide plate toward the first PCB end of the PCB causing the mechanical switch to be in the closed position in response to the smart keyboard receiving an input from a user of the information handling system; and a wire actuator comprised of a semi-rigid material configured to pull the switch slide plate toward the second PCB end of the PCB causing the mechanical switch to be in the open position in response to receiving power from the at least one battery.

In one or more of the disclosed embodiments, the on state of the microcontroller unit causes the smart keyboard to be electrically enabled for use and the off state of the microcontroller unit causes the smart keyboard to be electrically disabled for use. In one or more of the disclosed embodiments, the switch contact finger is further configured to electrically decouple from the one or more contact pads of the mechanical switch causing the mechanical switch to be in the open position.

In one or more of the disclosed embodiments, the switch slide plate includes: a switch lock pin configured to: lock the mechanical switch in the open position by fitting within a switch lock socket of smart keyboard, wherein locking the mechanical switch in the open position prevents the switch slide spring from pulling the switch slide plate toward the first PCB end of the PCB; and unlock the mechanical switch from the open position by ejecting from the switch lock socket in response to receiving a downward force applied on the switch lock pin by the input from the user, wherein unlocking the mechanical switch from the open position allows the switch slide spring to pull the switch slide plate toward the first PCB end of the PCB causing the mechanical switch to be in the closed position.

In one or more of the disclosed embodiments, the input from the user of the information handling system comprises at least one keystroke entered into the smart keyboard by the user.

In one or more of the disclosed embodiments, the at least one keystroke comprises a keystroke of a spacebar key of the smart keyboard.

In one or more of the disclosed embodiments, the switch slide plate includes: a switch contact finger configured to: electrically couple with one or more contact pads of the mechanical switch when the switch slide plate is in the closed position causing the microcontroller unit to be in the on state; and electrically decouple from the one or more contact pads when the switch slide plate is in the open position causing the microcontroller unit to be in the off state.

In one or more of the disclosed embodiments, the microcontroller is configured to: monitor the smart keyboard for an additional input from the user; determine if a first threshold period has occurred, the first threshold period comprising a period of time in which the additional input from the user has ended; and in response to determining that the first threshold period has occurred: cause the microcontroller unit to be in an idle state; determine if a second threshold period has occurred, the second threshold period comprising a period of time in which the first threshold period has ended; and in response to determining that the second threshold period has occurred: transmit a signal to the at least one battery, the signal causing the at least one battery to provide power to the wire actuator, the provided power causing the semi-rigid material comprising the wire actuator to pull the switch slide plate toward the second PCB end of the PCB causing the mechanical switch to be in the open position.

In one or more of the disclosed embodiments, the semi-rigid material is a shape-memory alloy.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
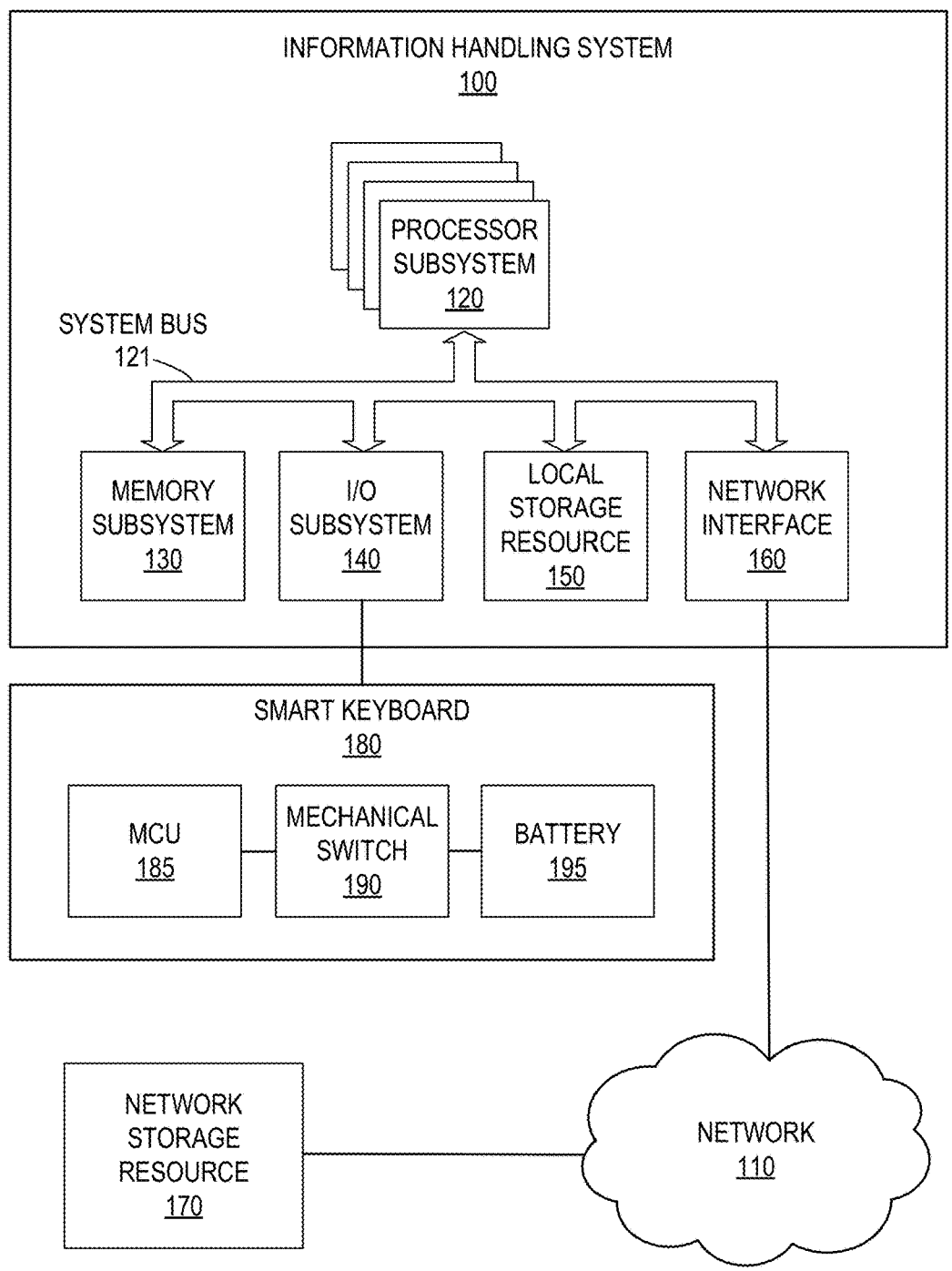
FIG. 1 is a block diagram of selected elements of an embodiment of an information handling system that includes a smart keyboard.

This document describes a smart keyboard for an information handling system that may include: at least one battery; a microcontroller unit having an on state and an off state; a mechanical switch electrically coupling the at least one battery to the microcontroller unit, the mechanical switch having an open position causing the microcontroller unit to be in the off state and a closed position causing the microcontroller unit to be in the on state, the mechanical switch including: a printed circuit board (PCB) having a first PCB end and a second PCB end; a switch slide plate slidably coupled to the PCB, the switch slide plate configured to slide toward the first PCB end of the PCB causing the mechanical switch to be in the closed position and to slide toward the second PCB end of the PCB causing the mechanical switch to be in the open position; a switch slide spring configured to pull the switch slide plate toward the first PCB end of the PCB causing the mechanical switch to be in the closed position in response to the smart keyboard receiving an input from a user of the information handling system; and a wire actuator comprised of a semi-rigid material configured to pull the switch slide plate toward the second PCB end of the PCB causing the mechanical switch to be in the open position in response to receiving power from the at least one battery.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140 communicatively coupled to a smart keyboard 180, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

In information handling system 100, smart keyboard 180 may comprise a system, device, or apparatus generally operable to receive input from a user of information handling system 100. In particular, smart keyboard 180 may be or include a peripheral hardware device used to input text, characters, and/or other commands into information handling system 100. In one embodiment, smart keyboard 180 may be communicatively coupled to I/O subsystem 140 of information handling system 100 via a wired connection (e.g., via USB connection). In another embodiment, smart keyboard 180 may be communicatively coupled to I/O subsystem 140 of information handling system 100 via wireless connection (e.g., via radio frequency, infrared, Bluetooth technology, and the like). In the embodiment illustrated in FIG. 1, smart keyboard 180 includes a microcontroller unit (MCU) 185, a mechanical switch 190, and at least one battery 195. In other embodiments, smart keyboard 180 may include additional, fewer, and/or any combination of devices or elements suitable for receiving user input from a user of information handling system 100.

Conventional wireless keyboard devices may include several respective states that allow the wireless keyboard devices to conserve power when not receiving input from users. For example, a conventional wireless keyboard may include an active state in which the wireless keyboard receives keystrokes from a user, an idle state in which the wireless keyboard is no longer receiving keystrokes from the user, and a sleep state in which the wireless keyboard may enter a low power-consumption mode in response to prolonged periods of inactivity. However, a given conventional wireless keyboard may spend a majority (e.g., 90%) of its lifecycle in a sleep state which may utilize a significant portion (e.g., 20 to 25%) of the overall battery life of the wireless keyboard. This is nonideal in that battery life may be a deciding factor in purchasing decisions made by consumers regarding wireless peripheral devices. Therefore, smart keyboard 180 includes MCU 185 to monitor input from a user of information handling system 100 and mechanical switch 190 to electrically decouple MCU 185 from battery 195, thereby electrically disabling smart keyboard 180 for use in response to periods of inactivity.

In the embodiment illustrated in FIG. 1, MCU 185 may be a suitable system, apparatus, or device operable to electrically enable and electrically disable smart keyboard 180 for use. In particular, MCU 185 may have an on state and an off state in which smart keyboard 180 is electrically enabled and electrically disabled for use, respectively. The on state of MCU 185 may be caused in response to receiving input from a user of information handling system 100. That is, mechanical switch 190 may electrically couple MCU 185 to battery 195 upon smart keyboard 180 receiving an input from a user thereby causing MCU 185 to be in the on state. In contrast, the off state may be caused in response to periods of inactivity. That is, MCU 185 may electrically disable smart keyboard 180 from use in response to periods of inactivity in which smart keyboard 180 does not receive additional input from a user.

To identify periods of inactivity, MCU 185 can monitor smart keyboard 180 for additional input from a user following the input that caused MCU 185 to be in the on state. MCU 185 can determine a period of time in which the additional input from the user has ended, or a "first threshold period," and can cause MCU 185 to be in a low power-consumption state, or an "idle state," in response to determining that the first threshold period has occurred. For example, if a user allows smart keyboard 180 to remain inactive for 5 minutes, MCU 185 may determine that a first threshold period has occurred and can cause MCU 185 to be in the idle state to conserve battery life of battery 195. MCU 185 may additionally determine a period of time in which the first threshold period has ended (i.e., a period of time in which MCU 185 has been in the idle state), or a "second threshold period." In response to determining that the second threshold period has occurred, MCU 185 can cause mechanical switch 190 of smart keyboard 180 to be in the open position, thereby causing MCU 185 to be in the off state and smart keyboard 180 to be electrically disabled for use. For example, MCU 185 may determine that smart keyboard 180 has been in the idle state for 15 minutes following the first threshold period and can cause mechanical switch 190 to be in the open position based on the occurrence of the second threshold period. In this way, MCU 185 may increase the overall battery life of battery 195 making smart keyboard 180 more energy efficient than conventional wireless keyboard devices (e.g., increasing 2 million keystrokes per battery life cycle to 2.5 million keystrokes).

In the embodiment illustrated in FIG. 1, mechanical switch 190 may be a suitable system, apparatus, or device operable to couple MCU 185 and battery 195. In particular, mechanical switch 190 may couple MCU 185 and battery 195 such that mechanical switch 190 can electrically enable smart keyboard 180 for use when mechanical switch 190 is in a "closed position," thereby completing the electrical circuit (i.e., comprised of MCU 185, mechanical switch 190, and battery 195) of smart keyboard 180 allowing battery 195 to supply power to MCU 185. Mechanical switch 190 may electrically enable smart keyboard 180 for use in response to smart keyboard 180 receiving input from a user (e.g., one or more keystrokes entered into smart keyboard 180). In addition, mechanical switch 190 can electrically disable smart keyboard 180 for use when mechanical switch 190 is in an "open position," thereby breaking the electrical circuit of smart keyboard 180 preventing battery 195 from supplying power to MCU 185. Mechanical switch 190 may electrically disable smart keyboard 180 for use in response to periods of inactivity in which smart keyboard 180 receives no additional input from a user. It is noted that although mechanical switch 190 is described within the context a smart keyboard herein, other embodiments of mechanical switch 190 may electrically disable/enable any electronic device and/or system suitable for self-shutdown and powering on in response to receiving a mechanical input (e.g., a button press) from a user. Mechanical switch 190 is described in further detail with respect to FIGS. 2A-4B.

In the embodiment illustrated in FIG. 1, battery 195 may be a suitable system, apparatus, or device operable to provide power to mechanical switch 190 thereby causing mechanical switch 190 to be in the open position and MCU 185 to be in the off state. In one embodiment, battery 195 may be communicatively coupled with MCU 185 such that MCU 185 may transmit a signal to battery 195 causing battery 195 to provide power to mechanical switch 190. Upon receiving the power provided by battery 195, mechanical switch 190 may be in the open position thereby cutting power to MCU 185 causing smart keyboard 180 to be electrically disabled for use. In the embodiment illustrated in FIG. 1, information handling system 100 includes one battery 195 coupled to mechanical switch 190. In other embodiments, information handling system 100 may include any number of additional batteries suitable for providing power to MCU 185 and mechanical switch 190.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2A:
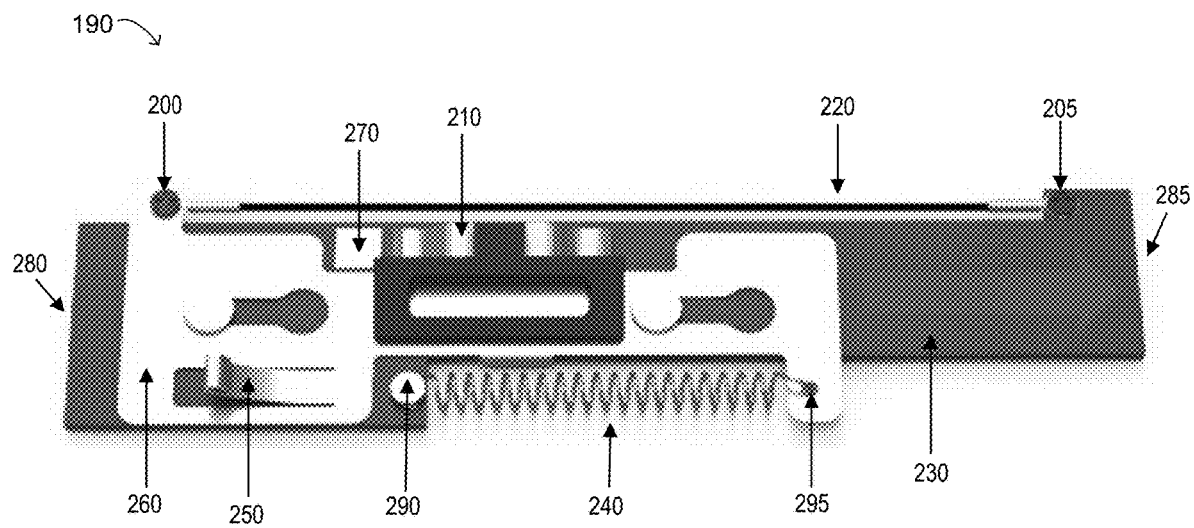
FIG. 2A is a top view of an embodiment of a mechanical switch in an open position.
Figure 2B:
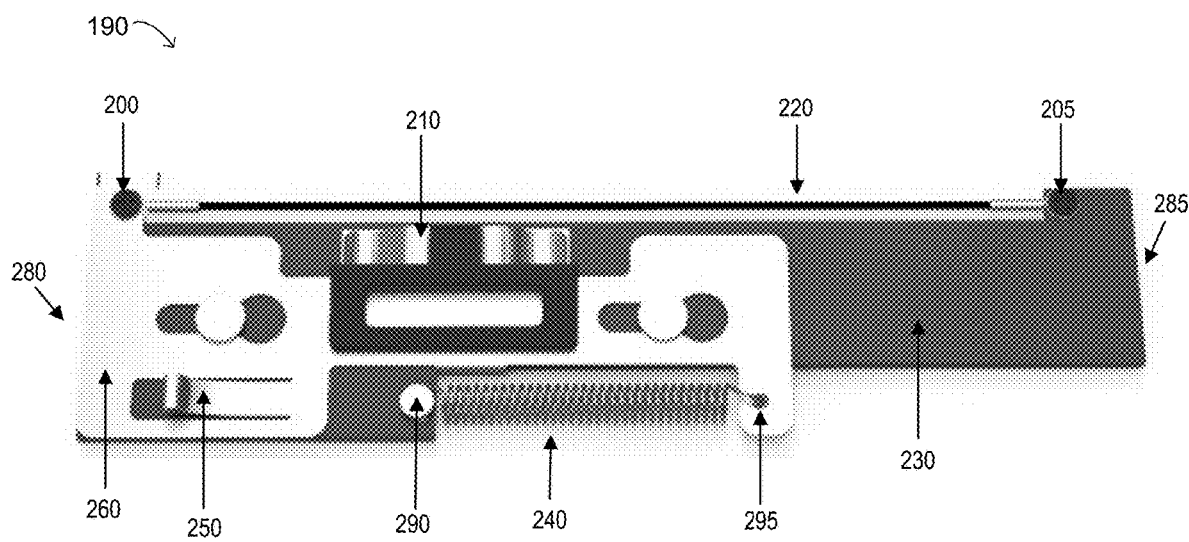
FIG. 2B is a top view of an embodiment of a mechanical switch in a closed position.

FIGS. 2A and 2B are a top views of an embodiment of a mechanical switch in an open position and a closed position, respectively. In the embodiment illustrated in FIGS. 2A and 2B, mechanical switch 190 includes a printed circuit board (PCB) 230, a switch slide spring 240, a wire actuator 220, one or more contact pads 270, and a switch slide plate 260. Switch slide plate 260 may include a switch contact finger 210 and a switch lock pin 250. In other embodiments, mechanical switch 190 may include additional, fewer, and/or any combination of components suitable for electrically enabling and electrically disabling smart keyboard 180 for use.

In the embodiment illustrated in FIGS. 2A and 2B, PCB 230 may be a suitable system, apparatus, or device operable to provide a substrate for components of mechanical switch 190. PCB 230 may be or include an electronic circuit comprised of thin strips of conducting material (e.g., such as copper) used to electrically couple battery 195 to MCU 185 when mechanical switch 190 is in the closed position (as shown in FIG. 2B). In the embodiment shown in FIGS. 2A and 2B, PCB 230 includes a first PCB end 280 and a second PCB end 285.

In the embodiment illustrated in FIGS. 2A and 2B, switch slide plate 260 may be a suitable system, apparatus, or device operable to slidably couple to PCB 230. In particular, switch slide plate 260 may be configured to slide toward the second PCB end 285 of PCB 230 causing mechanical switch 190 to be in the open position (as shown in FIG. 2A). In addition, switch slide plate 260 may be configured to slide toward the first PCB end 280 of PCB 230 causing mechanical switch 190 to be in the closed position (as shown in FIG. 2B). Switch slide plate 260 may include switch contact finger 210 and switch lock pin 250.

In the embodiment illustrated in FIGS. 2A and 2B, switch slide spring 240 may be a suitable system, apparatus, or device operable to cause mechanical switch 190 to be in the closed position. Specifically, switch slide spring 240 may include a first spring end 290 and a second spring end 295. As shown in FIGS. 2A and 2B, first spring end 290 may be coupled to first PCB end 280 of PCB 230 and second spring end 295 may be coupled to switch slide plate 260. In response to smart keyboard 180 receiving an input from a user, switch slide spring 240 may provide a spring force used to pull switch slide plate 260 toward the first PCB end 280 of PCB 230 as switch slide spring 240 returns to a state of equilibrium causing mechanical switch 190 to be in the closed position.

In the embodiment illustrated in FIGS. 2A and 2B, wire actuator 220 may be a suitable system, apparatus, or device operable to cause mechanical switch 190 to be in the open position. In particular, wire actuator 220 may be comprised of a semi-rigid material including a first wire end 200 and a second wire end 205. As shown in FIGS. 2A and 2B, first wire end 200 may be coupled to switch slide plate 260 and second wire end 205 may be coupled to second PCB end 285 of PCB 230. In one embodiment, wire actuator 220 may be comprised of a shape-memory alloy capable of being stretched and/or elongated into a mechanically deformed position while in a cold state and returning to an original, or remembered, position when brought to a heated state. For example, wire actuator 220 may have an original position as shown in FIG. 2A and may become elongated into a mechanically deformed position as shown in FIG. 2B in response to switch slide plate 260 sliding toward first PCB end 280 of PCB 230. In response to receiving power provided by battery 195, wire actuator 220 may pull switch slide plate 260 toward second PCB end 285 of PCB 230 as wire actuator 220 returns to its remembered position causing mechanical switch 190 to be in the open position. In another embodiment, wire actuator 220 may be or include a solenoid actuator used to cause mechanical switch 190 to be in the open position when the solenoid actuator becomes energized. For example, wire actuator 220 may generate a magnetic field in response to receiving power provided by battery 195. The magnetic field generated by wire actuator 220 may pull switch slide plate 260 toward second PCB end 285 of PCB 230 (e.g., using one or more electromagnetic forces) causing mechanical switch 190 to be in the open position. In other embodiments, wire actuator 220 may be or include an electrical actuator, mechanical actuator, and/or any combination of actuators suitable for translating linear movement to cause mechanical switch 190 to be in the open position.

In the embodiment illustrated in FIGS. 2A and 2B, switch contact finger 210 may be a suitable system, apparatus, or device operable to electrically couple/decouple battery 195 to/from MCU 185. In particular, as switch slide plate 260 slides toward the first PCB end 280 of PCB 230 in response to smart keyboard 180 receiving input from a user, switch contact finger 210 may electrically couple with one or more contact pads 270 (as shown in FIG. 2A) of mechanical switch 190 causing mechanical switch 190 to be in the closed position. In addition, as switch slide plate 260 slides toward the second PCB end 285 of PCB 230, switch contact finger 210 may electrically decouple from the one or more contact pads 270 of mechanical switch 190 causing mechanical switch 190 to be in the open position.

Figure 4A:
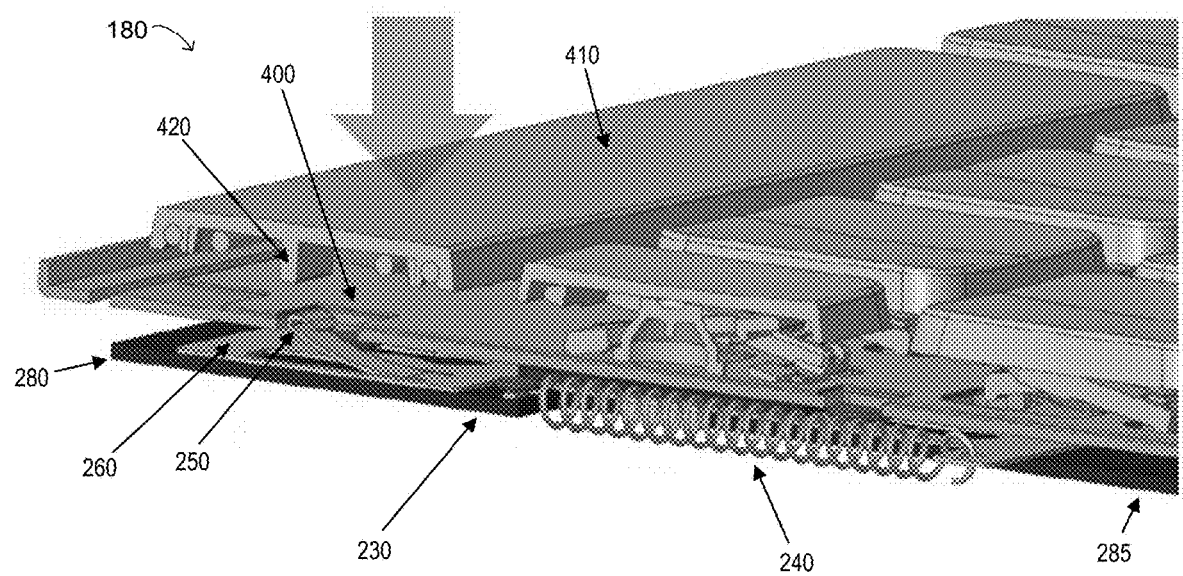
FIG. 4A is a cross-sectional view of an embodiment of a mechanical switch in an open position in a smart keyboard.
Figure 4B:
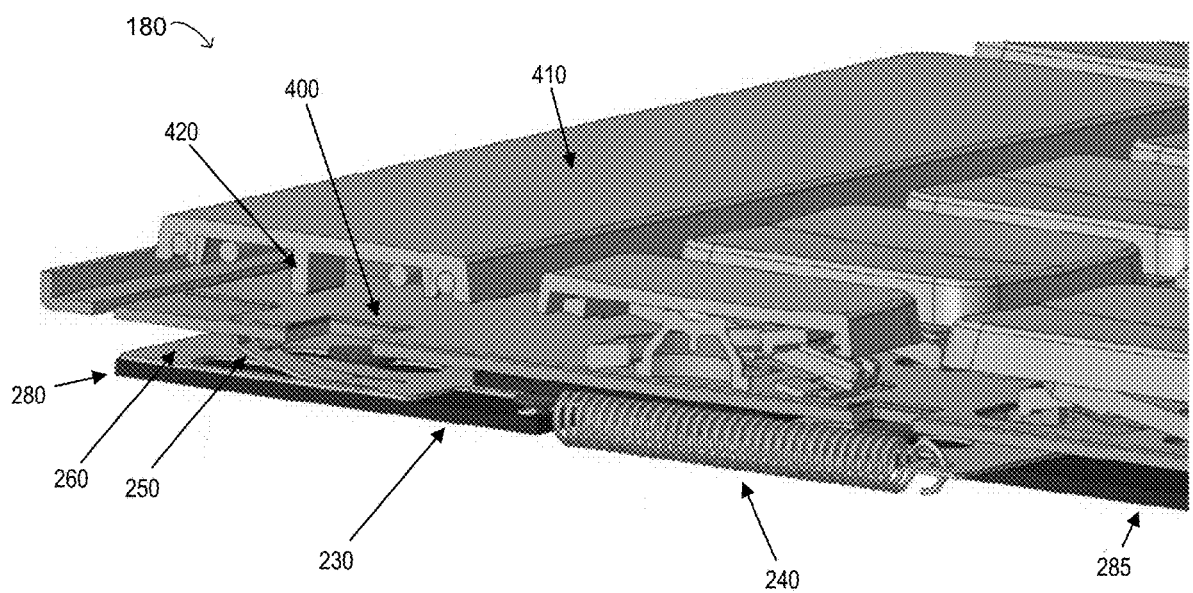
FIG. 4B is a cross-sectional view of an embodiment of a mechanical switch in a closed position in a smart keyboard.

In the embodiment illustrated in FIGS. 2A and 2B, switch lock pin 250 may be a suitable system, apparatus, or device operable to lock mechanical switch 190 in the open position. Specifically, switch lock pin 250 may be contoured to fit within a switch lock socket 400 (as shown in FIGS. 4A and 4B) preventing switch slide spring 240 from pulling switch slide plate 260 toward the first PCB end 280 of PCB 230 causing mechanical switch 190 to be in the closed position.

FIG. 2A is a top view of an embodiment of mechanical switch 190 in an open position. The open position of mechanical switch 190 illustrated in FIG. 2A causes MCU 185 to be in the off state which results in smart keyboard 180 being electrically disabled for use. The open position of mechanical switch 190 may be caused in response to periods of inactivity in which smart keyboard 180 does not receive additional input from a user. Specifically, MCU 185 may monitor smart keyboard 180 and determine that a first threshold period and a second threshold period of inactivity have occurred in which smart keyboard 180 does not receive additional user input. In response to determining that the second threshold period has occurred, MCU 185 transmits a signal to battery 195. The signal causes battery 195 to provide power to wire actuator 220 and the provided power causes the semi-rigid material comprising wire actuator 220 to pull switch slide plate 260 toward second PCB end 285 of PCB 230 causing mechanical switch 190 to be in the open position. Thus, the open position of mechanical switch 190 illustrated in FIG. 2A is configured to prevent battery 195 (not shown in figures) from providing power to MCU 185 to preserve the battery life of battery 195 when smart keyboard 180 in not in use.

FIG. 2B is a top view of an embodiment of a mechanical switch in a closed position. The closed position of mechanical switch 190 illustrated in FIG. 2B causes MCU 185 to be in the on state which results in smart keyboard 180 becoming electrically enabled for use. The closed position of mechanical switch 190 may be caused in response to smart keyboard 180 receiving an input from a user of information handling system 100. Specifically, smart keyboard 180 may receive a keystroke from a user such as pressing the spacebar and/or enter key of smart keyboard 180, for example. The keystroke applies a downward force on switch lock pin 250 below causing switch lock pin 250 to eject from a switch lock socket 400 (as shown in FIGS. 4A and 4B), thereby unlocking mechanical switch 190 from the open position. With mechanical switch 190 unlocked from the open position, switch slide spring 240 may pull switch slide plate 260 toward first PCB end 280 of PCB 230 causing mechanical switch 190 to be in the closed position. The closed position of mechanical switch 190 illustrated in FIG. 2B is configured to allow battery 195 (not shown in figure) to provide power to MCU 185 causing MCU 185 to be in the on state while smart keyboard 180 is in use.

Figure 3A:
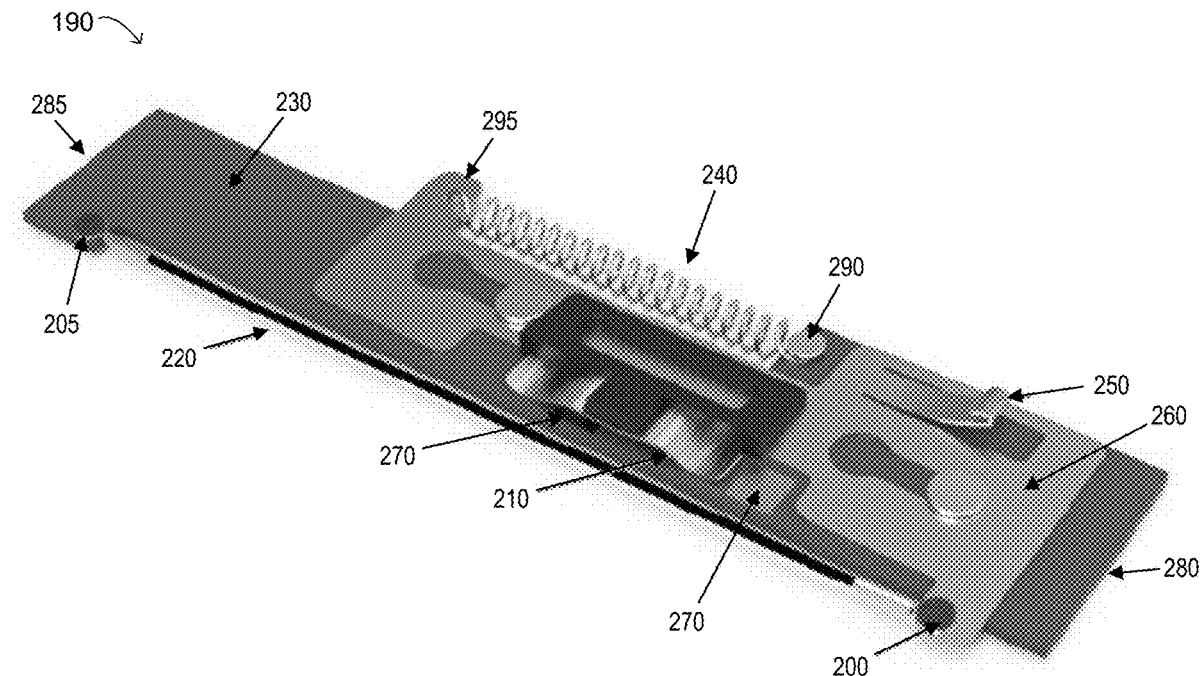
FIG. 3A is a front three-quarter view of an embodiment of a mechanical switch in an open position.
Figure 3B:
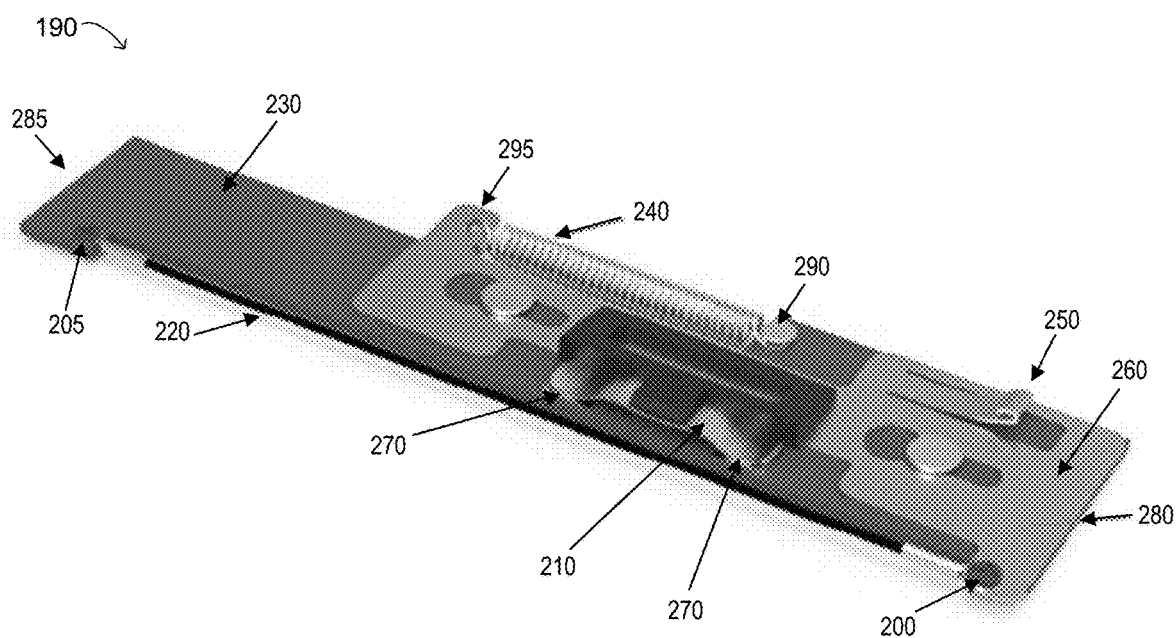
FIG. 3B is a front three-quarter view of an embodiment of a mechanical switch in a closed position.

FIGS. 3A and 3B are front three-quarter views of an embodiment of a mechanical switch in an open position and a closed position, respectively. In the embodiment illustrated in FIGS. 3A and 3B, mechanical switch 190 may include similar components to those previously described with respect to FIGS. 2A and 2B. In other embodiments, mechanical switch 190 may include additional, fewer, and/or any combination of components suitable for electrically enabling and electrically disabling smart keyboard 180 for use.

FIG. 3A is a front three-quarter view of an embodiment of a mechanical switch in an open position. In the open position shown in FIG. 3A, switch slide spring 240 is in an expanded state, applying a spring force on switch slide plate 260 toward first PCB end 280 of PCB 230. The semi-rigid material comprising wire actuator 220 is in the remembered position, pulling switch slide plate 260 toward second PCB end 285 of PCB 230 and causing mechanical switch 190 to be in the open position. Because mechanical switch 190 is in the open position, switch contact finger 210 is separated from contact pads 270. That is, switch contact finger 210 is electrically decoupled from contact pads 270 thereby breaking the electrical circuit (i.e., comprised of MCU 185, mechanical switch 190, and battery 195) of smart keyboard 180 which prevents battery 195 from supplying power to MCU 185. Therefore, smart keyboard 180 is electrically disabled for use until receiving input from a user to conserve battery life of battery 195.

FIG. 3B is a front three-quarter view of an embodiment of a mechanical switch in a closed position. In the closed position shown in FIG. 3B, switch slide spring 240 is in a state of equilibrium having applied a spring force pulling switch slide plate 260 toward first PCB end 280 of PCB 230 to cause mechanical switch 190 to be in the closed position. The semi-rigid material comprising wire actuator 220 has become elongated into the mechanically deformed position in response to switch slide spring 240 pulling switch slide plate 260 toward first PCB end 280 of PCB 230. Because mechanical switch 190 is in the closed position, switch contact finger 210 is no longer separated from contact pads 270. Rather, switch contact finger 210 is electrically coupled with contact pads 270 thereby completing the electrical circuit of smart keyboard 180 allowing battery 195 to supply power to MCU 185. Therefore, smart keyboard 180 is electrically enabled for use until MCU 185 transmits a signal to battery 195 causing battery 195 to provide power to wire actuator 220 and causing wire actuator 220 to return to the remembered position shown in FIG. 3A.

FIGS. 4A and 4B are cross-sectional views of an embodiment of a mechanical switch in an open position and a closed position, respectively. In the embodiment illustrated in FIGS. 4A and 4B, mechanical switch 190 may include similar components to those previously described with respect to FIGS. 2A-3B. It is noted that although key 410 of smart keyboard 180 is represented as an enter key in the embodiment shown in FIGS. 4A and 4B, any key of smart keyboard 180, and/or combinations thereof, may be used to unlock mechanical switch 190 from the open position in other embodiments. In other embodiments, smart keyboard 190 may additionally include a power key having a key plunger functionally similar to key plunger 420 shown in FIGS. 4A and 4B. In other embodiments, mechanical switch 190 may include any number of switch lock pins, switch slide springs, switch slide plates, switch contact fingers, wire actuators, and/or PCBs suitable for electrically enabling and electrically disabling smart keyboard 180 for use.

FIG. 4A is a cross-sectional view of an embodiment of a mechanical switch in an open position in a smart keyboard. In the embodiment shown in FIG. 4A, switch lock pin 250 is locking mechanical switch 190 in the open position. Specifically, switch lock pin 250 is contoured to fit within switch lock socket 400 of smart keyboard 180 such that switch lock socket 400 prevents switch slide spring 240 from pulling switch slide plate 260 toward first PCB end 280 of PCB 230. This is shown in FIG. 4A where switch lock pin 250 is positioned within switch lock socket 400 below key plunger 420 of key 410. In addition, the semi-rigid material comprising wire actuator 220 (not shown in figure) is in the remembered position, having pulled switch slide plate 260 toward second PCB end 285 of PCB 230 causing mechanical switch 190 to be in the open position. In the embodiment shown in FIG. 4A, mechanical switch 190 will remain in the open position until smart keyboard 180 receives an input from a user, such as a keystroke that applies a downward force on key 410.

FIG. 4B is a cross-sectional view of an embodiment of a mechanical switch in a closed position in a smart keyboard. In the embodiment shown in FIG. 4B, switch lock pin 250 has been ejected from switch lock socket 400 in response to smart keyboard 180 receiving an input from a user. In particular, a downward force applied to key 410 has caused key plunger 420 to apply the downward force to switch lock pin 250 below. This downward force caused switch lock pin 250 to eject from switch lock socket 400 thereby unlocking mechanical switch 190 from the open position. In response to mechanical switch 190 becoming unlocked from the open position, switch slide spring 240 has pulled switch slide plate 260 toward first PCB end 280 of PCB 230 causing mechanical switch 190 to be in the closed position as switch slide spring 240 returns to a state of equilibrium. In addition, the semi-rigid material comprising wire actuator 220 (not shown in figure) has become elongated into the mechanically deformed position in response to switch slide spring 240 pulling switch slide plate 260 toward first PCB end 280 of PCB 230. In the embodiment shown in FIG. 4B, mechanical switch 190 will remain in the closed position until MCU 185 determines that a first threshold period and a second threshold period of inactivity have occurred and transmits a signal to battery 195. The transmitted signal causes battery 195 to provide power to wire actuator 220 which causes wire actuator 220 to return to the remembered position while pulling switch slide plate 260 back into the open position shown in FIG. 4A.

Figure 5:
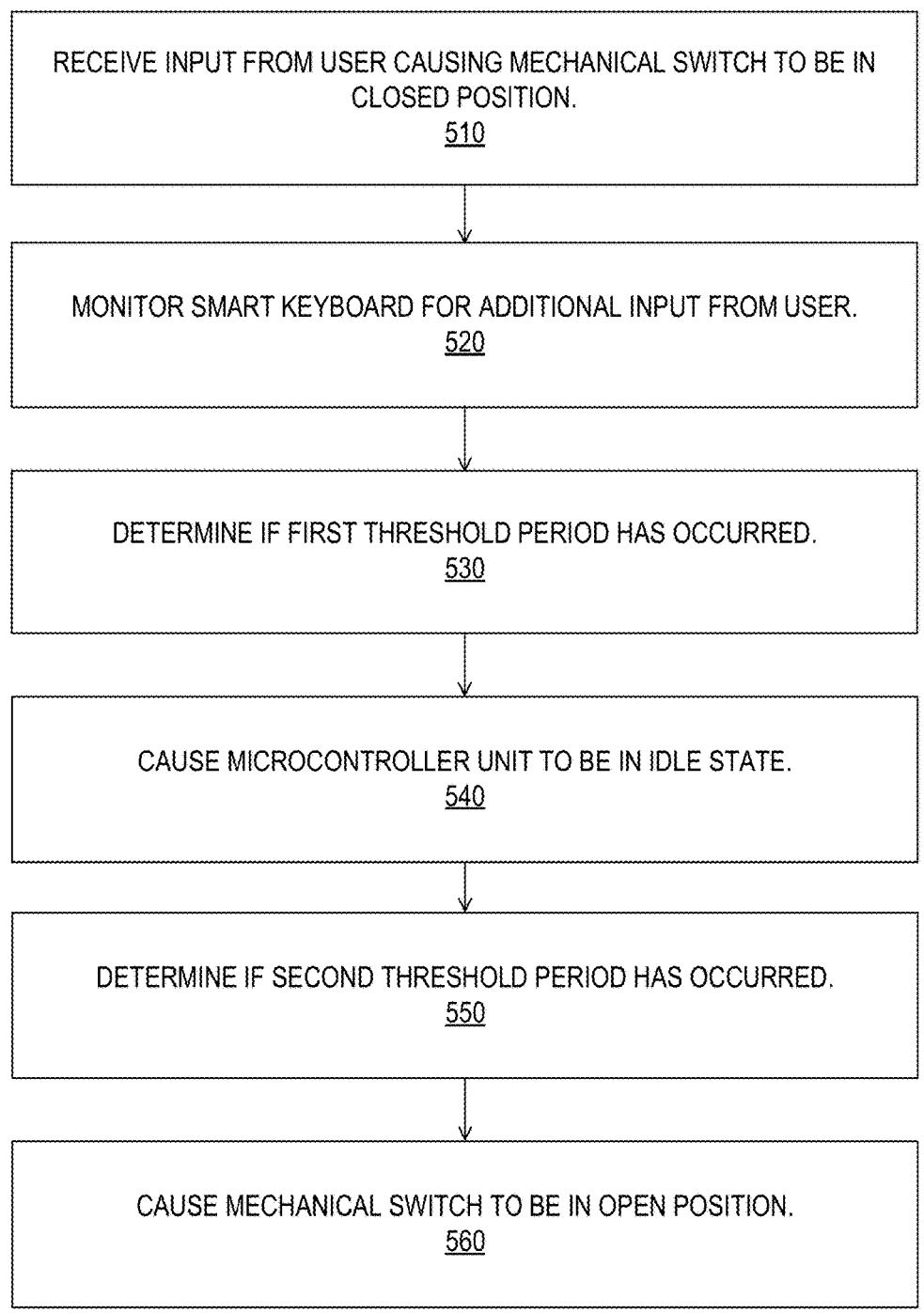
FIG. 5 is a flowchart depicting selected elements of an embodiment of a method for electrically enabling and electrically disabling a smart keyboard for an information handling system using a mechanical switch.

FIG. 5 is a flowchart depicting selected elements of an embodiment of a method for electrically enabling and electrically disabling a smart keyboard for an information handling system using a mechanical switch. It is noted that certain operations described in method 500 may be optional or may be rearranged in different embodiments.

Method 500 may begin at step 510, where smart keyboard 180 may receive an input from a user of information handling system 100. For example, a user may enter a keystroke into smart keyboard 180 by pressing the spacebar key as shown in FIGS. 4A and 4B. The input from the user may cause mechanical switch 190 of smart keyboard 180 to be in a closed position and MCU 185 to be in an on state. The on state of MCU 185 may cause smart keyboard 180 to be electrically enabled for use. In step 520, MCU 185 may monitor smart keyboard 180 for an additional input from the user. In step 530, MCU 185 can determine if a first threshold period has occurred. In particular, MCU 185 can determine if a period of time has occurred in which the additional input from the user has ended. In response to determining that the first threshold period has occurred, MCU 185 may cause MCU 185 to be in an idle state in step 540. In step 550, MCU 185 can determine if a second threshold period has occurred. Specifically, MCU 185 can determine if a period of time has occurred in which the first threshold period of time has ended (i.e., a period of time in which MCU 185 has been in the idle state). In response to determining that the second threshold period has occurred, MCU 185 can cause mechanical switch 190 to be in an open position in step 560. This open position may cause MCU 185 to be in an off state and smart keyboard 180 to be electrically disabled for use.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A smart keyboard for an information handling system, the smart keyboard comprising:
   at least one battery;
   a microcontroller unit having an on state and an off state;
   a mechanical switch electrically coupling the at least one battery to the microcontroller unit, the mechanical switch having an open position causing the microcontroller unit to be in the off state and a closed position causing the microcontroller unit to be in the on state, the mechanical switch including:
      a printed circuit board (PCB) having a first PCB end and a second PCB end;
      a switch slide plate slidably coupled to the PCB, the switch slide plate configured to slide toward the first PCB end of the PCB causing the mechanical switch to be in the closed position and to slide toward the second PCB end of the PCB causing the mechanical switch to be in the open position;
      a switch slide spring configured to pull the switch slide plate toward the first PCB end of the PCB causing the mechanical switch to be in the closed position in response to the smart keyboard receiving an input from a user of the information handling system; and
      a wire actuator comprised of a semi-rigid material configured to pull the switch slide plate toward the second PCB end of the PCB causing the mechanical switch to be in the open position in response to receiving power from the at least one battery.

2. The smart keyboard of claim 1, wherein the on state of the microcontroller unit causes the smart keyboard to be electrically enabled for use and the off state of the microcontroller unit causes the smart keyboard to be electrically disabled for use.

3. The smart keyboard of claim 1, wherein the switch slide plate includes:
   a switch lock pin configured to:
      lock the mechanical switch in the open position by fitting within a switch lock socket of smart keyboard, wherein locking the mechanical switch in the open position prevents the switch slide spring from pulling the switch slide plate toward the first PCB end of the PCB; and
      unlock the mechanical switch from the open position by ejecting from the switch lock socket in response to receiving a downward force applied on the switch lock pin by the input from the user, wherein unlocking the mechanical switch from the open position allows the switch slide spring to pull the switch slide plate toward the first PCB end of the PCB causing the mechanical switch to be in the closed position.

4. The smart keyboard of claim 1, wherein the input from the user of the information handling system comprises at least one keystroke entered into the smart keyboard by the user.

5. The smart keyboard of claim 4, wherein the at least one keystroke comprises a keystroke of a spacebar key of the smart keyboard.

6. The smart keyboard of claim 1, wherein the switch slide plate includes:
   a switch contact finger configured to:
      electrically couple with one or more contact pads of the mechanical switch when the switch slide plate is in the closed position causing the microcontroller unit to be in the on state; and
      electrically decouple from the one or more contact pads when the switch slide plate is in the open position causing the microcontroller unit to be in the off state.

7. The smart keyboard of claim 1, wherein the microcontroller is configured to:
   monitor the smart keyboard for an additional input from the user;
   determine if a first threshold period has occurred, the first threshold period comprising a period of time in which the additional input from the user has ended; and
   in response to determining that the first threshold period has occurred:
      cause the microcontroller unit to be in an idle state;
      determine if a second threshold period has occurred, the second threshold period comprising a period of time in which the first threshold period has ended; and
      in response to determining that the second threshold period has occurred:
         transmit a signal to the at least one battery, the signal causing the at least one battery to provide power to the wire actuator, the provided power causing the semi-rigid material comprising the wire actuator to pull the switch slide plate toward the second PCB end of the PCB causing the mechanical switch to be in the open position.

8. The smart keyboard of claim 1, wherein the semi-rigid material is a shape-memory alloy.

9. The mechanical switch of claim 1, wherein the semi-rigid material is a shape-memory alloy.

10. A method for electrically enabling and electrically disabling a smart keyboard for an information handling system using a mechanical switch, the method comprising:
   receiving, by the smart keyboard, an input from a user of the information handling system, the input from the user causing the mechanical switch of the smart keyboard to be in a closed position, the closed position causing a microcontroller unit of the smart keyboard to be in an on state, the microcontroller unit in the on state causing the smart keyboard to be electrically enabled for use;

monitoring, by the microcontroller unit, the smart keyboard for an additional input from the user;

determining if a first threshold period has occurred, the first threshold period comprising a period of time in which the additional input from the user has ended; and in response to determining that the first threshold period has occurred:

causing the microcontroller unit to be in an idle state;

determining if a second threshold period has occurred, the second threshold period comprising a period of time in which the first threshold period has ended; and in response to determining that the second threshold period has occurred:

causing the mechanical switch of the smart keyboard to be in an open position, the open position causing the microcontroller unit to be in an off state, the microcontroller unit in the off state causing the smart keyboard to be electrically disabled for use.

11. The method of claim 10, wherein the mechanical switch includes:

a printed circuit board (PCB) having a first PCB end and a second PCB end;

a switch slide plate slidably coupled to the PCB, the switch slide plate configured to slide toward the first PCB end of the PCB causing the mechanical switch to be in the closed position and to slide toward the second PCB end of the PCB causing the mechanical switch to be in the open position;

a switch slide spring configured to pull the switch slide plate toward the first PCB end of the PCB causing the mechanical switch to be in the closed position in response to the smart keyboard receiving an input from a user of the information handling system; and a wire actuator comprised of a semi-rigid material configured to pull the switch slide plate toward the second PCB end of the PCB causing the mechanical switch to be in the open position in response to receiving power from at least one battery of the smart keyboard.

12. The method of claim 11, wherein the switch slide plate includes:

a switch lock pin configured to:

lock the mechanical switch in the open position by fitting within a switch lock socket of smart keyboard, wherein locking the mechanical switch in the open position prevents the switch slide spring from pulling the switch slide plate toward the first PCB end of the PCB; and unlock the mechanical switch from the open position by ejecting from the switch lock socket in response to receiving a downward force applied on the switch lock pin by the input from the user, wherein unlocking the mechanical switch from the open position allows the switch slide spring to pull the switch slide plate toward the first PCB end of the PCB causing the mechanical switch to be in the closed position.

13. The method of claim 11, wherein the switch slide plate includes:

a switch contact finger configured to:

electrically couple with one or more contact pads of the mechanical switch when the switch slide plate is in the closed position causing the microcontroller unit to be in the on state; and electrically decouple from the one or more contact pads when the switch slide plate is in the open position causing the microcontroller unit to be in the off state.

14. The method of claim 10, wherein the input from the user of the information handling system comprises at least one keystroke entered into the smart keyboard by the user.

15. The method of claim 14, wherein the at least one keystroke comprises a keystroke of a spacebar key of the smart keyboard.

16. A mechanical switch of a smart keyboard of an information handling system, the mechanical switch comprising:

a printed circuit board (PCB) having a first PCB end and a second PCB end;

a switch slide plate slidably coupled to the PCB, the switch slide plate configured to slide toward the first PCB end of the PCB causing the mechanical switch to be in a closed position and to slide toward the second PCB end of the PCB causing the mechanical switch to be in an open position;

a switch slide spring configured to pull the switch slide plate toward the first PCB end of the PCB causing the mechanical switch to be in the closed position in response to the smart keyboard receiving an input from a user of the information handling system; and a wire actuator comprised of a semi-rigid material configured to pull the switch slide plate toward the second PCB end of the PCB causing the mechanical switch to be in the open position in response to receiving power from at least one battery of the smart keyboard.

17. The mechanical switch of claim 16, wherein the switch slide plate includes:

a switch lock pin configured to:

lock the mechanical switch in the open position by fitting within a switch lock socket of smart keyboard, wherein locking the mechanical switch in the open position prevents the switch slide spring from pulling the switch slide plate toward the first PCB end of the PCB; and unlock the mechanical switch from the open position by ejecting from the switch lock socket in response to receiving a downward force applied on the switch lock pin by the input from the user, wherein unlocking the mechanical switch from the open position allows the switch slide spring to pull the switch slide plate toward the first PCB end of the PCB causing the mechanical switch to be in the closed position.

18. The mechanical switch of claim 16, wherein the input from the user of the information handling system comprises at least one keystroke entered into the smart keyboard by the user.

19. The mechanical switch of claim 18, wherein the at least one keystroke comprises a keystroke of a spacebar key of the smart keyboard.

20. The mechanical switch of claim 16, wherein the switch slide plate includes:

a switch contact finger configured to:

electrically couple with one or more contact pads of the mechanical switch when the switch slide plate is in the closed position; and electrically decouple from the one or more contact pads when the switch slide plate is in the open position.

* * * * *